United States Patent [19]
Ramsey

[11] Patent Number: 5,157,243
[45] Date of Patent: Oct. 20, 1992

[54] HIGH SPEED BAR CODE SCANNING ON INSERTERS USING PIVOTABLE MOVING BEAM BAR CODES SCANNERS

[75] Inventor: James S. Ramsey, Shelton, Conn.

[73] Assignee: Pitney Bowes Inc., Stamford, Conn.

[21] Appl. No.: 456,708

[22] Filed: Dec. 26, 1989

[51] Int. Cl.⁵ .................. G06F 15/46; G06K 7/10
[52] U.S. Cl. .................. 235/376; 235/462; 235/467
[58] Field of Search ........... 235/375, 383, 470, 436, 235/462, 475, 476, 472, 454, 376, 379, 380; 382/7, 57; 209/584, 900, 546, 564, 3.1, 3.3

[56] References Cited

U.S. PATENT DOCUMENTS

| | | | |
|---|---|---|---|
| 3,511,368 | 5/1970 | Kajitani et al. | 209/900 |
| 3,743,819 | 7/1973 | Kapsambelis et al. | 235/435 |
| 3,899,687 | 8/1975 | Jones | 250/568 |
| 3,907,197 | 9/1975 | Poschl | 235/61.11 E |
| 4,006,343 | 2/1977 | Izura et al. | 235/61.11 E |
| 4,025,761 | 5/1977 | Hayosh et al. | 235/61.11 E |
| 4,027,142 | 5/1977 | Paup et al. | 235/379 |
| 4,057,784 | 11/1977 | Tafoya | 340/146.3 F |
| 4,064,390 | 12/1977 | Hildebrand et al. | 235/467 X |
| 4,093,865 | 6/1978 | Nicki | 250/566 |
| 4,140,271 | 2/1979 | Nojiri et al. | 235/440 |
| 4,196,846 | 4/1980 | Kao et al. | 235/475 |
| 4,606,660 | 8/1986 | Bradshaw et al. | 209/584 |
| 4,652,732 | 3/1987 | Nicki | 235/462 |
| 4,689,490 | 8/1987 | Thomas et al. | 250/566 |
| 4,707,790 | 11/1987 | Gomes et al. | 364/478 |
| 4,713,532 | 12/1987 | Knowles | 235/467 |
| 4,748,316 | 5/1988 | Dickson | 235/454 |
| 4,762,984 | 8/1988 | Knowles et al. | 235/383 |
| 4,766,298 | 8/1988 | Meyers | 235/462 |
| 4,794,237 | 12/1988 | Ferrante | 235/457 |
| 4,795,224 | 1/1989 | Goto | 350/6.3 |
| 4,796,242 | 1/1989 | Pierce | 369/32 |
| 4,808,804 | 2/1989 | Krichever et al. | 235/462 |
| 4,835,544 | 5/1989 | Winterburn | 346/1.1 |
| 4,908,768 | 3/1990 | Gelfer et al. | 235/375 |
| 5,008,520 | 4/1991 | Georgiou et al. | 235/462 |

FOREIGN PATENT DOCUMENTS

| | | |
|---|---|---|
| 1285018 | 8/1972 | United Kingdom . |
| 1392924 | 5/1975 | United Kingdom . |
| 1457591 | 12/1976 | United Kingdom . |
| 2102610A | 2/1983 | United Kingdom . |
| 2167221A | 5/1986 | United Kingdom . |

Primary Examiner—Stuart S. Levy
Assistant Examiner—Edward H. Sikorski
Attorney, Agent, or Firm—Charles R. Malandra, Jr.; Melvin J. Scolnick

[57] ABSTRACT

In an inserter, an apparatus for reading a bar code symbol on a sheet comprising feeder means for sequentially feeding a plurality of sheets, at least one containing a bar code symbol printed thereon. A moving beam scanner is positioned to scan at least two times the bar code symbol on at least one of the sheets as the sheet is fed from the feeding means. The apparatus includes means for decoding the bar code symbol. The moving beam scanner can be pivoted to scan either ladder position bar code symbols or picket fence position bar code symbols without requiring any further changes to the inserter.

6 Claims, 4 Drawing Sheets

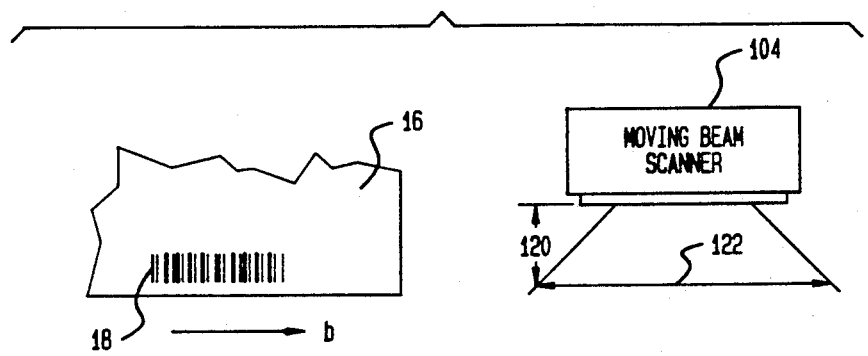
FIG. 4A
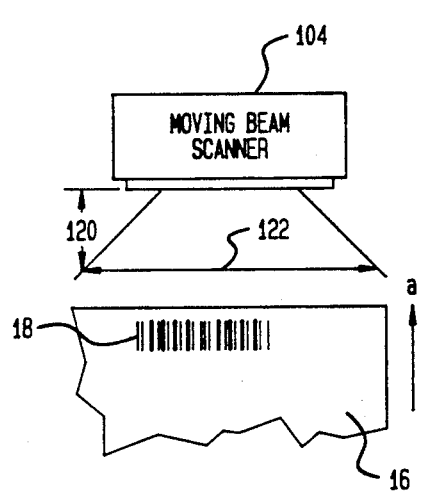
FIG. 4B
FIG. 5
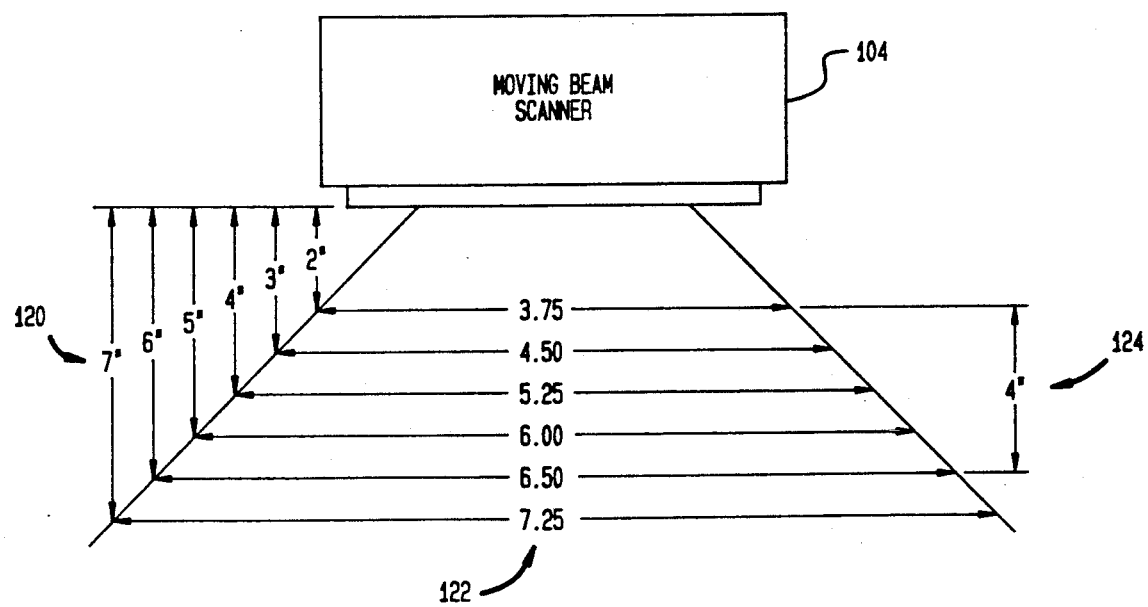

HIGH SPEED BAR CODE SCANNING ON INSERTERS USING PIVOTABLE MOVING BEAM BAR CODES SCANNERS

FIELD OF THE INVENTION

This invention relates to bar code scanning of documents on inserters, and more particularly, to high speed bar code scanning.

BACKGROUND OF THE INVENTION

It is known to use of bar code symbols printed on an article in many applications. One example of such use of bar code symbols includes printing a bar code symbol on a ticket, tag, or label to be read by a department store clerk using a wand containing a bar code reader. Bar code symbols on items are also read in retail stores having a checkout counter containing a generally X-shaped window under which a flying spot scanner is located. The flying spot scanner is a device in which a beam of light is generated by a laser device and is caused to move within the area of the window for the purpose of reading the bar code symbol located on an article that is moved across the window by a store clerk.

Another type of activity in which bar code symbols are now being used is the processing of mail, such as in the sorting of mail pieces by automated sorters which include bar code readers. It is also known to use bar codes in inserting devices. A fixed beam bar code scanner is a device in which a fixed beam of light is generated by a light source within the scanner for the purpose of reading the bar code symbol located on the article being scanned as the bar code symbol passes by the fixed beam of light one bar at a time. Fixed beam bar code scanners are suitable for use in a device, such as an inserter, where the bar code symbol on the article being scanned can be maintained in alignment with the beam of the fixed beam scanner. Examples of such inserters are the model 8300 series inserters available from Pitney Bowes Inc., Stamford, Connecticut. Generally, in such inserters, sheets from a stack or a continuous web, having bar code symbols thereon, are fed sequentially past a bar code scanner for processing in the inserter. The bar code symbol on each sheet is scanned to determine control information contained in the bar code symbol, for example, how many sheets are to be inserted into an envelope. Once the determination is made as to how many sheets are to be fed together, the sheets are subsequently folded and inserts from feeder stations are added to the sheets and eventually the sheets with inserts are inserted into an envelope.

Until recently, the speed of a sheet being scanned by a fixed beam scanner in an inserter was required to be relatively slow to insure that the bar code symbol was scanned accurately. In patent application Ser. No. 269,390, filed Nov. 10, 1988 and assigned to Pitney Bowes Inc., now U.S. Pat. No. 5,008,520, and incorporated herein by reference, a method and apparatus using a fixed beam scanner for reading a bar code on a moving sheet moving at a high speed is shown.

Use of fixed beam bar code scanners in an inserter has been found to have certain limitations. One limitation is that the fixed beam bar code scanner can only read bar code symbols presented in a format commonly referred to as a ladder position bar code symbol. The sheet being scanned must be positioned so that the bar code symbol passes under, or over as the case may be, the bar code scanner one bar at a time.

Some users of inserters have a need to print bar code symbols at the bottom of a document, commonly referred to as "picket fence" position bar codes. Still other inserter users may have a need to use, at different times, both ladder and picket fence position bar codes. Because fixed beam bar code scanners can only read ladder position bar codes on documents fed from a high speed feeder, documents having picket fence position bar codes must be arranged in the high speed feeder so that when the document is fed the bar code symbol can be scanned as a ladder position bar code. For inserters handling documents having picket fence position bar code symbols, extra modules or components must be added to the inserter, such as a ninety degree transport or a turner, to present the accumulated documents in a position to be folded and inserted into an envelope. The addition of such modules prevents the user from easily changing to accommodate documents having ladder position bar codes.

Another limitation in using a fixed beam bar code scanner in an inserter is that the scanner can only perform one scan of the bar code symbol. Although fixed beam scanners can now handle the scanning of sheets moving at speeds of in excess of 100 inches/second, misreads have been experienced. Because the fixed beam scanner can only make one read of the bar code symbol, it cannot reread the bar code symbol after detecting a misread caused, for example, by imperfections in the printed bar code or by paper flutter.

It is an object of the present invention to provide high speed bar code scanning on inserters which is significantly more reliable.

It is another object of the present invention to reduce or eliminate misreads of bar code symbols in an inserter.

It is further object of the present invention to be able handle sheets having picket fence or ladder positioned bar codes without having to turn the sheets or build a ninety degree transport in the inserter system.

SUMMARY OF THE INVENTION

It has been discovered that high speed moving beam scanners can be utilized on inserters systems in which the sheets are moving at a high speed. In accordance with the present invention the use of moving beam scanners on inserter systems provides the capability to scan sheets containing picket fence or ladder position bar codes by an adjustment in the position of the head of the moving beam scanner rather than having to turn the sheets or to add ninety degree angle transports in the inserter.

It has been found that if more than one scan of the bar code symbol is made as the sheet is fed from the high speed feeder, the number of misreads detected could be significantly reduced or eliminated. In accordance with the present invention, a moving beam scanner, which is arranged in an inserter to perform multiple scans of the bar code symbol on a sheet moving at a high speed, can achieve such results.

According to the present invention an apparatus is provided for reading bar code symbols on sheets processed on an inserter. The system includes feeder means for sequentially feeding a plurality of sheets, at least one of which contains a bar code symbol printed thereon, means for scanning at least two times the bar code symbols of each of the sheets as the sheet is fed from the feeding means, and means in communication with said scanning means for decoding the bar codes symbol scanned by said scanning means.

In accordance with a further feature of the present invention, means are provided for positioning the moving beam scanner for scanning either a ladder positioned bar code symbol or a picket fence positioned bar code symbol.

BRIEF DESCRIPTION OF THE DRAWINGS

A complete understanding of the present invention may be obtained from the following detailed description of the preferred embodiment thereof, when taken in conjunction with the accompanying drawings wherein like reference numerals designate similar elements in the various figures and, in which:

FIG. 4a shows a moving beam scanner in the inserter system in FIG. 3 positioned to scan a picket fence position bar code symbol on a document;

FIG. 4b shows a moving beam scanner positioned to scan a ladder position bar code symbol on a document;

FIG. 5 shows a typical scan pattern of a moving beam scanner.

DETAILED DESCRIPTION OF THE INVENTION

Figure 1:
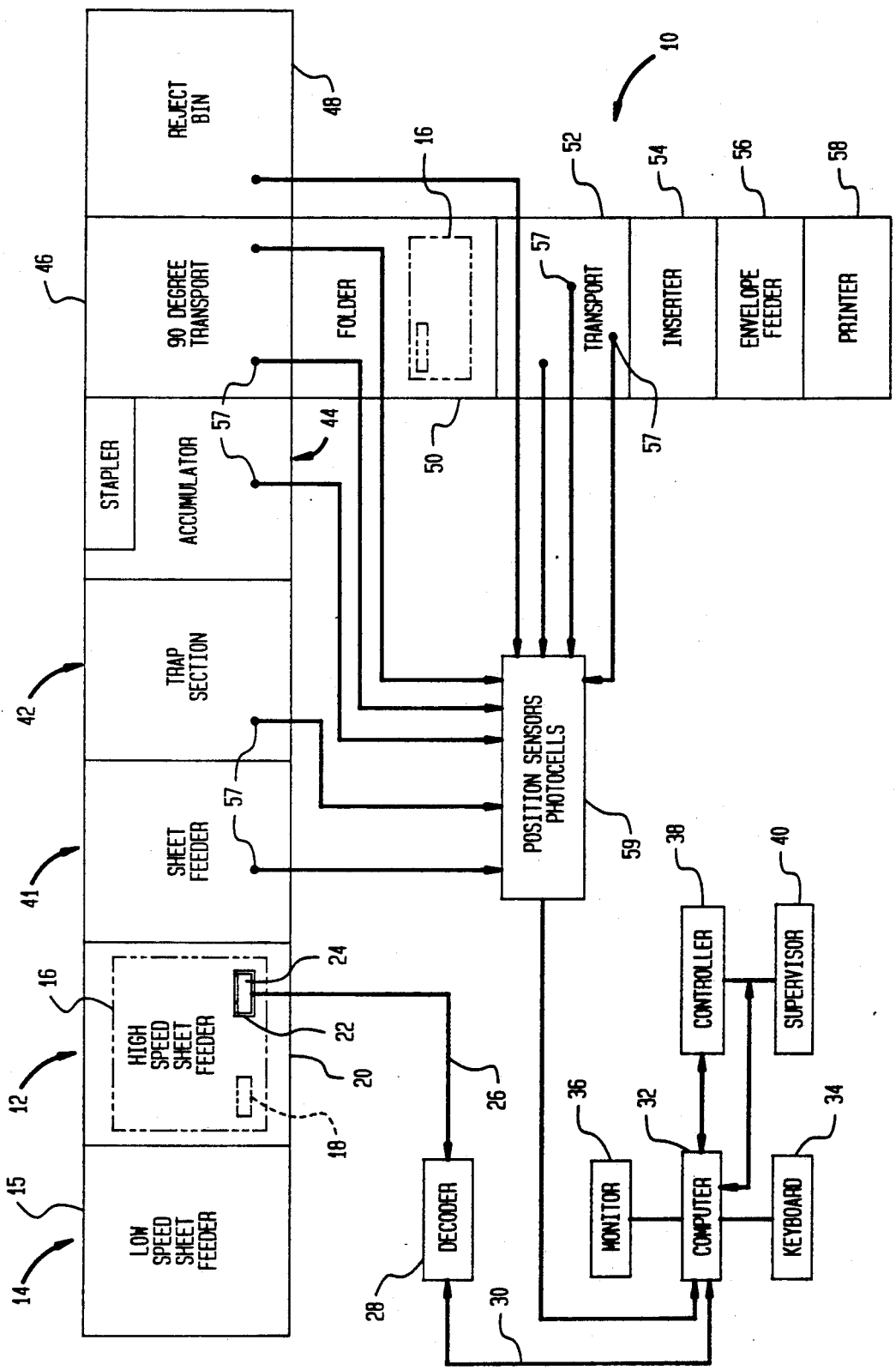
FIG. 1 is a schematic, plan view of a prior art inserter system having a fixed beam bar code scanner.
Figure 2:
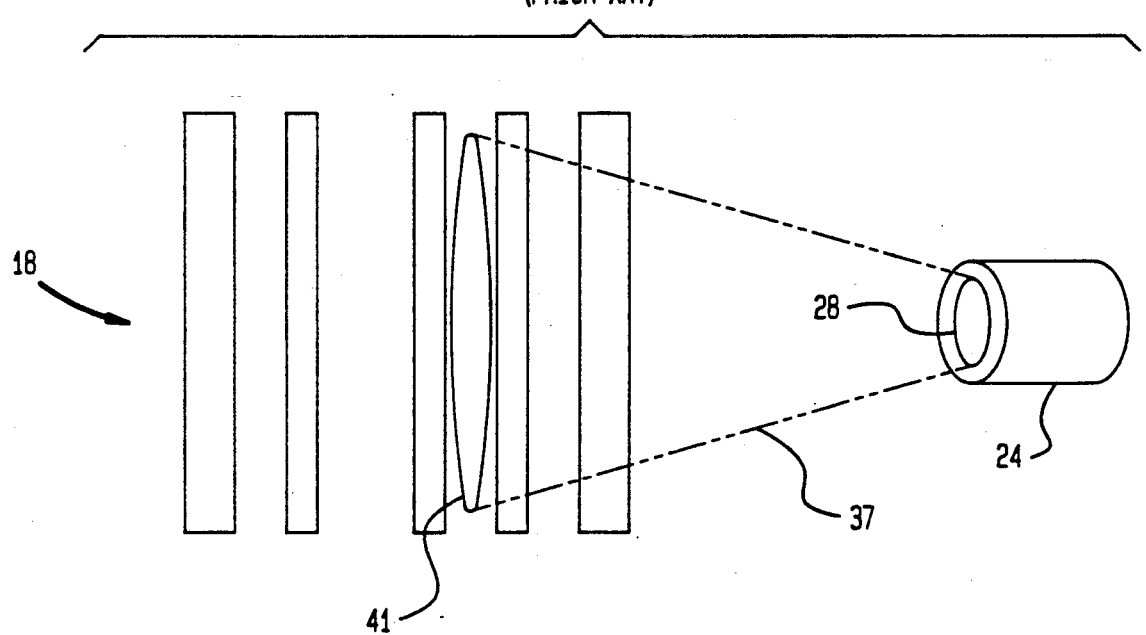
FIG. 2 shows a light beam of the fixed beam bar code scanner in FIG. 1 being directed upon a bar code.

FIG. 1 shows a schematic, plan view of a prior art inserter system having a fixed beam bar code scanner, described in U.S. patent application Ser. No. 269,390. Inserter system 10 includes a high speed sheet feeder 12 which is capable of conveying sheets at a speed of approximately 120 inches/second. The high speed sheet feeder 12 has a deck 20 that is supported by a frame 15. Deck 20 has an opening or aperture 22 therein. Fixed beam scanner 24 is in alignment with aperture 22 through which is directed a fixed beam of light from scanner 24. FIG. 2 shows scanner 24 directing a fixed beam of light 37 upon a bar code symbol 18 as described in application Ser. No. 269,390. The fixed beam scanner 24 has an elliptical shaped light beam 41 for reading sequentially each bar and space in the bar code symbol. In this configuration, fixed beam scanner 24 can only scan each bar code symbol one time. Although this configuration has proved to be effective in reading bar code symbols in inserters, misreads of bar code symbols have been experienced. Such misreads are attributed to problems such as paper flutter or a skewed sheet as the sheet passes by the fixed beam scanner. If a misread of bar code symbol 18 is detected, the inserter can only alert the operator of the misread. Another scan is not possible without operator intervention.

High speed feeder 12 sequentially feeds a stack of sheets past fixed beam scanner 24 wherein bar code symbol 18 on each sheet passes over aperture 22 and fixed beam scanner 24. After the number of sheets determined from the bar code symbol are accumulated and stapled at accumulator 44, the sheets are redirected by ninety degree transport 46 to place the sheets in the correct position for insertion into an envelope at inserter station 54. It will be understood that this change in direction is necessary for sheets having a picket fence positioned bar code symbol and that alternatively the sheets could have been turned rather than redirected.

Figure 3:
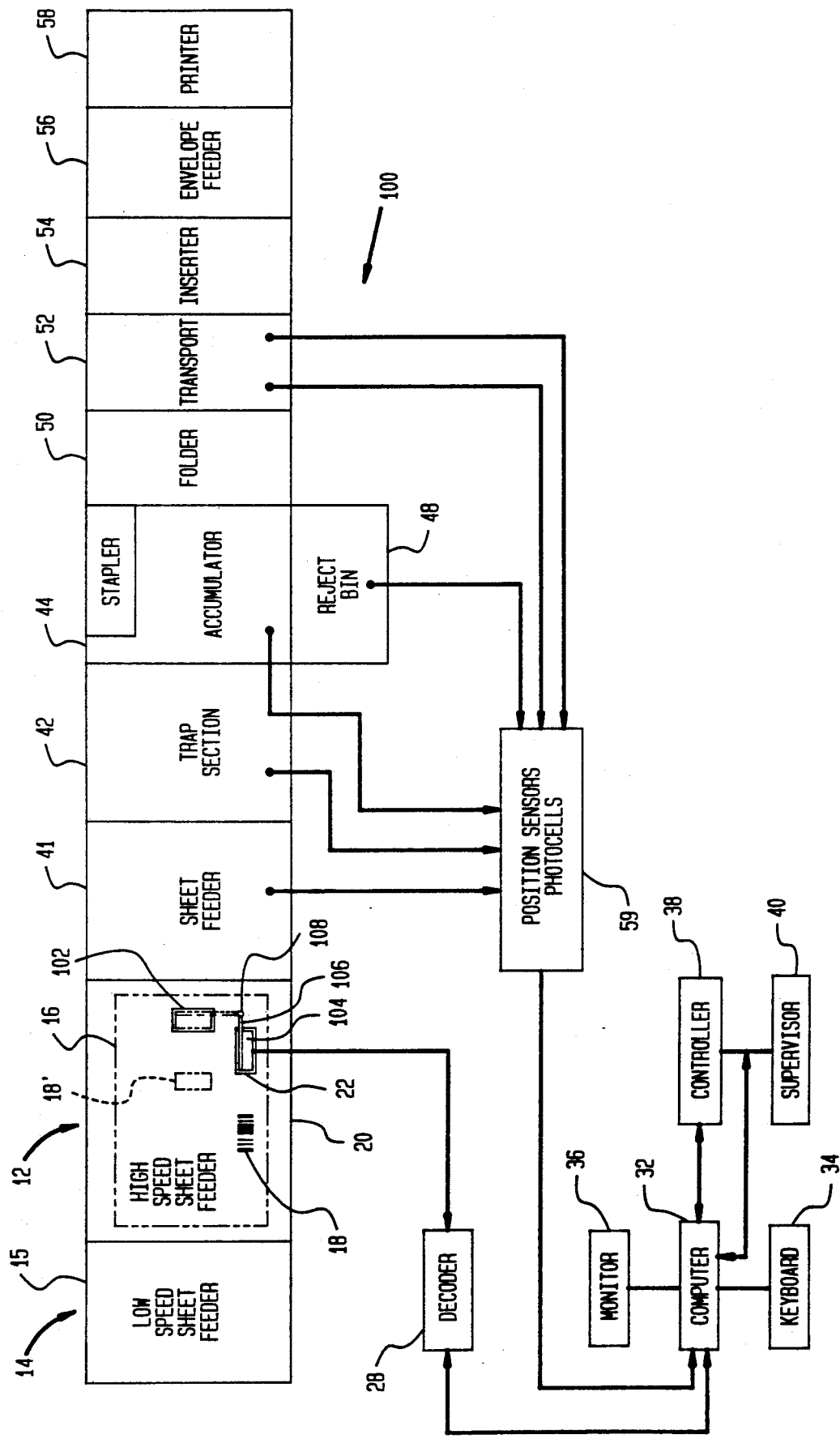
FIG. 3 is a schematic, plan view of an inserter system in which the present invention can be practiced.

Referring now to FIG. 3, an inserter system incorporating features of the present invention is shown generally at 100. For the purpose of illustrating the advantages over the prior art shown in FIG. 1, inserter system 100 parallels the schematic of inserter system 10 in FIG. 1. Inserter system 100 includes a high speed sheet feeder 12 that is capable of conveying sheets at a speed of approximately 120 inches/second. Optionally, upstream from high speed sheet feeder 12 is a low speed sheet feeder 14 that feeds sheets to high speed sheet feeder 12. Frame 15 supports high speed sheet feeder 12, low speed sheet feeder 14 and other modules of inserter system 100. High speed sheet feeder 12 has a deck 20 which is supported by frame 15 and which has an aperture 22 and an aperture 102. In alignment with aperture 22 is a moving beam scanner 104 positioned so as to direct a moving beam of light through aperture 22 for reading ladder position bar code symbols. Moving beam scanner 104 is attached to one end of bar 106 which is pivotably fastened at the other end to sheet feeder 12 at 108.

Moving beam scanners are scanners directing a beam of light which continuously sweeps at a high speed across a scan width. Moving beam scanners are generally used where an article containing a bar code symbol can be stopped briefly under the moving beam scanner or can be transported at a low speed passed the moving beam scanner. Until now, moving beam scanners, such as flying spot scanners used in grocery store checkout counters, have had too small a scan width and depth of field or were too large a size for any practical use in an inserter.

It has been found that a moving beam scanner having suitable dimensions, scan rate, depth of field and scan width can be used in place of a fixed beam scanner in an inserter. In the preferred embodiment, it has been found that with a depth of field large enough to eliminate the effect of paper flutter, for example one inch or more, and with a scan width large enough to achieve multiple scans on sheets passing at high speeds, a moving beam scanner used in place of the fixed beam scanner 24 in the inserter system 10 can significantly reduce or eliminate the misreads experienced with the fixed beam scanner 24.

Furthermore, it has been found that with a high scan rate, for example 800 scans per second, the moving beam scanner will be sufficient to perform multiple scans on bar code symbols passing in a ladder position or a picket fence position.

An example of moving beam scanner 104 suitable for the present invention is a scanner available from Electro Corporation of Sarasato, Fla., such as model S95000 Series Advanced Skanner with built in decoder having a visible laser diode light source and scanning at speeds greater than 800 scans per second. The S95000 Series Advanced Skanner is a rotating polygon type moving beam scanner having a depth of field, focal point and scan width suitable for use in an inserter, and is small enough for use in an inserter. Another suitable example of moving beam scanner 104 is a scanner available from Accu-Sort Systems, Inc. of Telford, Penna. such as model 45VLSI.

Referring again to FIG. 3, if bar 106 is rotated ninety degrees, moving beam scanner 104 can be repositioned so as to direct the moving beam of light through aperture 102 for reading picket fence position bar code 18'. An alternative method of repositioning scanner 104 is mounting scanner 104 directly to sheet feeder 12 in either of the two positions. Other know methods of fastening moving beams scanner 104 in the two positions can be used in the present invention.

It has been found that the scanning rates of such moving beam scanners which are required for use in the present invention must be fast enough to complete two or more scans on either ladder position or picket fence position bar code symbols on sheets fed at a high speed in an inserter. When moving beam scanner 104 is positioned to scan through aperture 22, a sheet containing a ladder position bar code passing across aperture 22 will be scanned as shown in FIG. 4a. When scanner 104 is positioned to scan through aperture 102, a picket fence position code will be scanned as shown in FIG. 4b. For purpose of illustration, FIGS. 4a and 4b provide a two dimensional view of scanner 104 scanning bar code 18 on sheet 16. It will be understood that in a three dimensional view scanner 104 is situated above sheet 16. It will be appreciated that scanner 104 can be positioned above deck 20 so as to scan from above deck 20 rather than through apertures 22 or 102.

Because of the capability of scanning either picket fence or ladder position bar codes by merely repositioning moving beam scanner 104, it has been found that the need for a ninety degree transport in an inserter system, such as shown at 46 in FIG. 1 has been eliminated. This capability provides the inserter user the flexibility to process documents with such different positioned bar code symbols without the need to perform extensive hardware changes on the inserter.

It will be understood that the speed of the sweeping pattern of moving beam scanner 104 must be suitable for multiple sweeps to be completed before any part of bar code symbol 18 moves the scan width 106 of scanner 104 sweeps field. It will be further understood that scan width 106 must be sufficiently longer than the length of the bar code 18 so that multiple scans of a ladder position bar code symbol can be accomplished as the sheet passes by bar code scanner 104 (FIG. 4A).

As previously stated, by using a moving beam scanner in an inserter, instead of a fixed beam scanner, an inserter can handle either picket fence or ladder position bar code symbols without the need to modify the inserter or add any additional equipment. It has been found that the moving beam scanner can easily be repositioned to handle both ladder position and picket fence position bar code symbols.

It has also been found that in an inserter a moving beam scanner can be more reliable than a fixed beam scanner. The fixed beam scanner makes only one scan of a passing bar code symbol. Fixed beam scanners can detect misreads but cannot perform another scan to obtain a correct scan. The multiple sweeps of the having beam scanner provides two or more scans of the bar code symbol which are used to obtain a correct scan when a misread is detected. If more than two scans are made on a bar code symbol the moving beam bar code scanner can also ignore scans resulting in transposition errors. Transposition errors are misreads which are not detectable by fixed beam bar code scanners because they appear to be correct scans. Because the scanning rate of the moving beam scanners are now approaching a thousand scans per second, multiple scans can be made on bar code symbols in either the ladder or picket fence position on sheets being fed at a high speed, for example one hundred inches per second or more.

Referring now to FIG. 5, a typical scan pattern for moving beam scanner 104 is shown. Various operating distances are shown at 120 and corresponding scan widths are shown at 122. In the preferred embodiment, moving beam scanner 104 has a scan rate of 800 scans per second and a depth of field of 4 inches as shown at 124. The parameters described above are for the purpose of describing the invention and are no way intended to limit the invention. It will be understood that the operating distances, scan widths, scan rate and depth of field described above will vary depending on the scanner model selected.

Generally, sheets processed by an inserter have bar code symbols with a minimum bar width of 0.0075 inches, a length of two inches and a height of one half inch. In the preferred embodiment, the focal point of scanner 104, i.e., the operating distance for best optical performance, for such bar code symbols is four inches. For sheets passing scanner 104 at a distance of four inches, the scan width for scanner 104 is 5.25 inches. Under these parameters and conditions, moving beam scanner 104 can make 26 scans of a ladder position bar code symbol (FIG. 4A) and 4 scans of a picket fence position bar code symbol (FIG. 4B). Generally, the first and last scan is ignored in decoding the bar code symbol to avoid erroneous scans. This leaves 24 scans for a ladder positioned bar code symbol and 2 scans for a picket fence bar code symbol. If the multiple scans of the bar code symbol are identical, then an accurate scan has been performed. If the scans differ, a misread is detected and an appropriate signal can be sent to the processor controlling the inserter and to the operator if operator action is required.

When a significant number of scans are made on a bar code symbol, such as described above for ladder position bar codes, a threshold number of identical scans can be established so that a low number of misreads can be ignored. For example, out of the 24 scans, if 20 are identical, the other 4 scans can be ignored.

It will be appreciated that there has been provided in accordance with the present invention a system for scanning for bar codes that fully satisfies the objects, aims and advantages set forth above, while this invention has been described in conjunction with specific embodiments thereof, many alternatives, modifications and variations will be apparent skilled in the art. Accordingly, it is intended to embrace all such alternatives, modifications and variations that follow within the spirit and scope of the appended claims.

What is claimed is:

1. In an inserter, an apparatus for reading a bar code symbol on a sheet being conveyed along a paper path, comprising:

means for feeding a plurality of sheets seriatim in a first direction along a paper path, at least one of said sheets containing a bar code symbol printed thereon,;

a moving beam scanner operatively connected to said feeder means for scanning the bar code symbol as the sheet is fed along the paper path;

means for pivoting said scanner to one of a first and second position, said first and second positions being in a plane parallel to the paper path and said second position being generally perpendicular to said first position, wherein said scanner when positioned in said first position provides a scan sweep in line with said first direction for scanning bar code symbols oriented in said first direction, and wherein said scanner when positioned in said second position provides a scan sweep in line with a second direction generally perpendicular to said first direction for scanning bar code symbols oriented in said second direction, said scanner in either position completing at least two scan sweeps of the bar code symbol; and means operatively connected to said scanner for interpreting the bar code symbol.

2. The apparatus according to claim 1 wherein said sheet is being fed by said feeder means at a speed of at least 100 inches per second.

3. The apparatus according to claim 1 wherein said interpreting means includes means for ignoring a scan detected as a misread.

4. The apparatus according to claim 3 wherein said interpreting means includes means for distinguishing between transposition errors and accurate reads when more than two scans are made.

5. The apparatus according to claim 4 wherein said scan sweep is generated in said moving beam scanner by a light source reflecting off a rotating polygon.

6. The apparatus according to claim 1 wherein some of said sheets are control documents for groups of said sheets being processed together, each of said control documents containing said bar code symbol printed thereon.

* * * * *